(12) United States Patent
Osterhoff

(10) Patent No.: US 11,597,361 B2
(45) Date of Patent: Mar. 7, 2023

(54) VEHICLE ASSIST SYSTEM

(71) Applicant: ZF FRIEDRICHSHAFEN AG, Friedrichshafen (DE)

(72) Inventor: Stephen Osterhoff, Livonia, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 274 days.

(21) Appl. No.: 16/582,546

(22) Filed: Sep. 25, 2019

(65) Prior Publication Data
US 2021/0086731 A1 Mar. 25, 2021

(51) Int. Cl.
| | | |
|---|---|---|
| B60T 7/00 | (2006.01) | |
| B60T 7/12 | (2006.01) | |
| B60T 8/32 | (2006.01) | |
| B60T 8/172 | (2006.01) | |

(52) U.S. Cl.
CPC .............. *B60T 7/12* (2013.01); *B60T 8/172* (2013.01); *B60T 8/321* (2013.01)

(58) Field of Classification Search
CPC ............ B60T 7/12; B60T 8/172; B60T 8/321
See application file for complete search history.

(56) References Cited

U.S. PATENT DOCUMENTS

| | | | | |
|---|---|---|---|---|
| 6,411,204 B1* | 6/2002 | Bloomfield | ............ | B60Q 1/535 340/471 |
| 2006/0155469 A1* | 7/2006 | Kawasaki | ............. | G01S 13/931 340/436 |
| 2008/0165028 A1* | 7/2008 | Fechner | ............... | G06V 10/255 340/901 |
| 2009/0072996 A1* | 3/2009 | Schoepp | ............... | G01S 7/4814 340/903 |
| 2015/0170429 A1* | 6/2015 | Denny | .................. | B60W 30/09 701/1 |

\* cited by examiner

*Primary Examiner* — Truc M Do
(74) *Attorney, Agent, or Firm* — Tarolli, Sundheim, Covell & Tummino LLP

(57) ABSTRACT

A method of braking a host vehicle traveling behind a second vehicle includes acquiring visual images of the second vehicle and determining an actual deceleration of the second vehicle based on the visual images. Non-visible light emitted by the second vehicle is detected. A commanded deceleration of the second vehicle is determined based on the detected light. A first signal is produced indicative of the actual deceleration. A second signal is produced indicative of the commanded deceleration. Braking of the host vehicle is initiated in response to at least one of the first and second signals.

16 Claims, 5 Drawing Sheets

VEHICLE ASSIST SYSTEM

TECHNICAL FIELD

The present invention relates generally to vehicle systems and, more specifically, relates to a vehicle assist system for controlling braking of the vehicle.

BACKGROUND

Current driver assistance systems (ADAS—advanced driver assistance system) offer a series of monitoring functions in vehicles. In particular, the ADAS can monitor the environment around the vehicle and notify the driver of the vehicle or other systems of the vehicle of conditions therein. To this end, the ADAS can capture images of the surrounding environment and digitally process the images to extract information. The information is used to warn the driver of road obstacles located along the driving path. A common ADAS includes automatic emergency braking to help prevent rear-end collision and lane detection to help maintain the vehicle within the commanded driving lane.

SUMMARY

A method of braking a host vehicle traveling behind a second vehicle includes acquiring visual images of the second vehicle and determining an actual deceleration of the second vehicle based on the visual images. Non-visible light emitted by the second vehicle is detected. A commanded deceleration of the second vehicle is determined based on the detected light. A first signal is produced indicative of the actual deceleration. A second signal is produced indicative of the commanded deceleration. Braking of the host vehicle is initiated in response to at least one of the first and second signals.

In another aspect, a system for controlling braking of a host vehicle traveling behind a second vehicle on a roadway includes a camera assembly provided on the host vehicle for acquiring visual images of the second vehicle. The camera assembly determines an actual deceleration of the second vehicle based on the visual images. The camera assembly detects non-visible light emitted by the second vehicle and determines a commanded deceleration of the second vehicle based on the detected light. The camera assembly produces a first signal indicative of the actual deceleration and a second signal indicative of the commanded deceleration. A controller receives the first and second signals and, in response to the at least one first and second signals, initiates braking of the host vehicle.

Other objects and advantages and a fuller understanding of the invention will be had from the following detailed description and the accompanying drawings.

DETAILED DESCRIPTION

Figure 1:
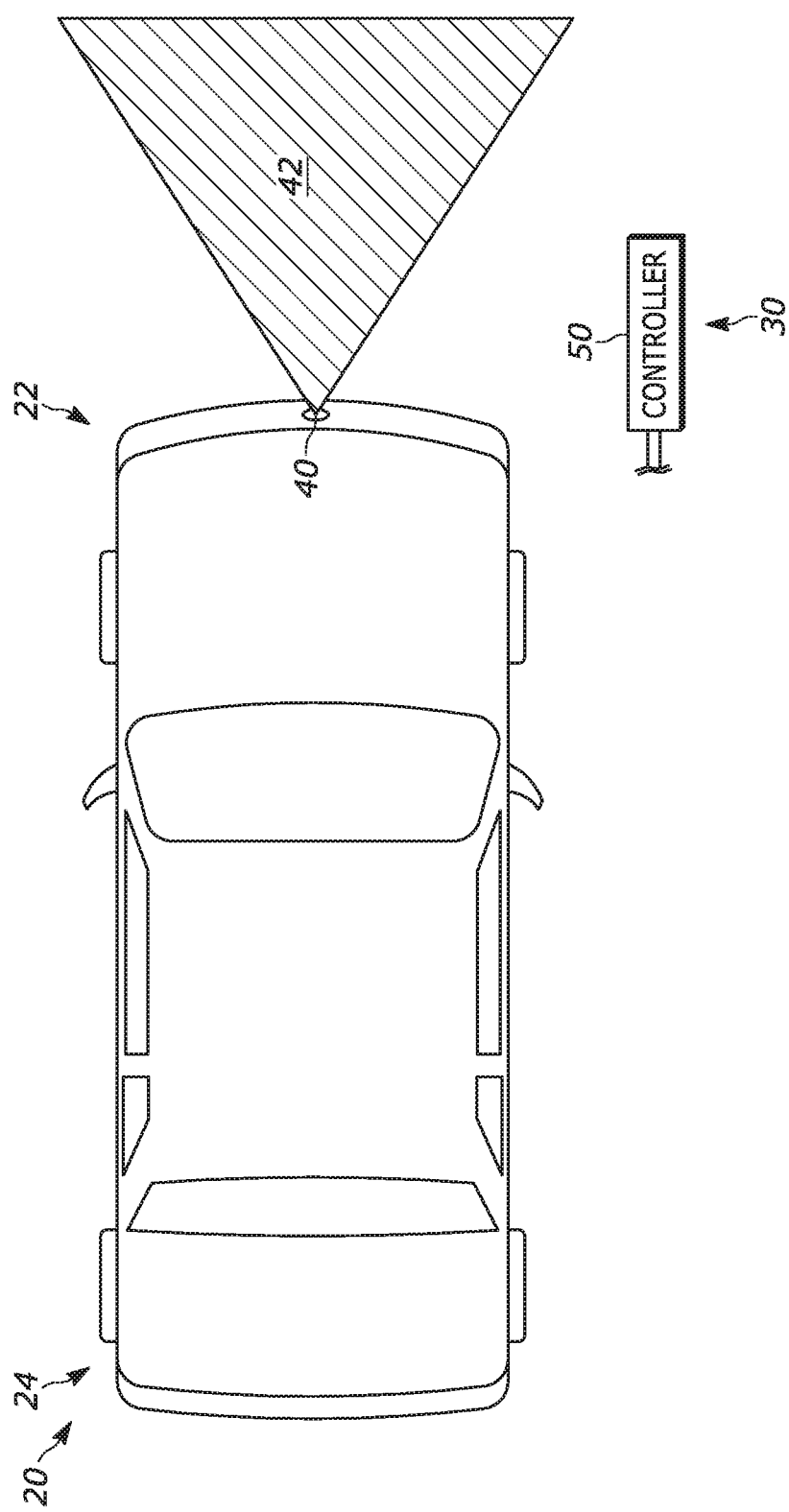
FIG. 1 is a top view of a host vehicle having an assist system in accordance with the present invention.

The present invention relates generally to vehicle systems and, more specifically, relates to a vehicle assist system for controlling a braking operation of the vehicle. FIG. 1 illustrates a host vehicle 20 having an example assist system 30 in accordance with the present invention.

The host vehicle 20 extends from a front end 22 to a rear end 24. The vehicle 20 includes at least one camera assembly 40 including a camera 44 and a software module 46 for processing data collected by the camera. It will be appreciated that the software module 46 can integrated with the camera 44 or located at a different location therefrom (not shown). The camera 44 has a field of view 42 extending away from the vehicle 20. As shown, a camera assembly 40 is connected to the front end 22 and has a field of view 42 extending in front of the vehicle 20. Alternatively or additionally, a camera assembly 40 can be connected to the rear end 24 of the vehicle 20 such that the field of view 42 extends rearward of the vehicle (not shown).

The camera assembly 40 is configured to both acquire visual images and detect non-visible light, e.g., infrared (IR) light or ultraviolet light, within the field of view 42. The non-visible light can be detected within the visual images or separately therefrom.

Figure 2:
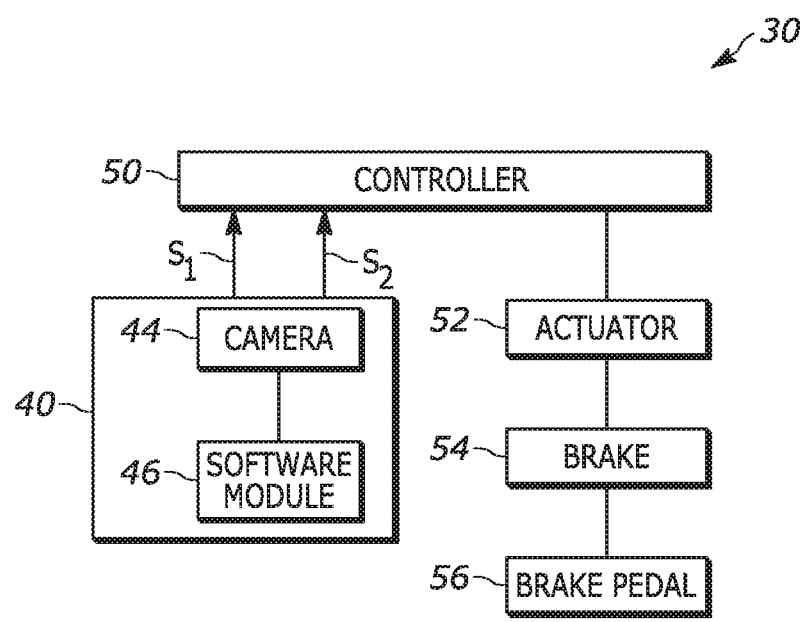
FIG. 2 is a schematic illustration of the assist system of FIG. 1.

Referring to FIG. 2, a controller 50 is connected to the camera assembly 40 and receives signals therefrom. More specifically, the camera assembly 40 sends one or more first signals $S_1$ to the controller 50 based on the acquired visual images in the field of view 42. The camera assembly 40 sends one or more second signals $S_2$ to the controller 50 based on the non-visible light detected in the field of view 42. To this end, the software module 46 can be integrated into the controller 50 (not shown).

The controller 50 is also electrically or wirelessly connected to an actuator 52 associated with the vehicle brake 54. The controller 50 can send a control signal to the brake actuator 52 to actuate the brake 54 and thereby decrease the speed of the vehicle 20, i.e., control a brake operation thereof. The brake 54 can also be operated manually by an operator of the host vehicle 20 by depressing a brake pedal 56. Although the brake pedal 56 is shown directly connected to the brake 54 it will be appreciated that the brake pedal could alternatively be connected to the actuator 52 and/or controller 50 (not shown) for operating the brake.

Figure 3A:
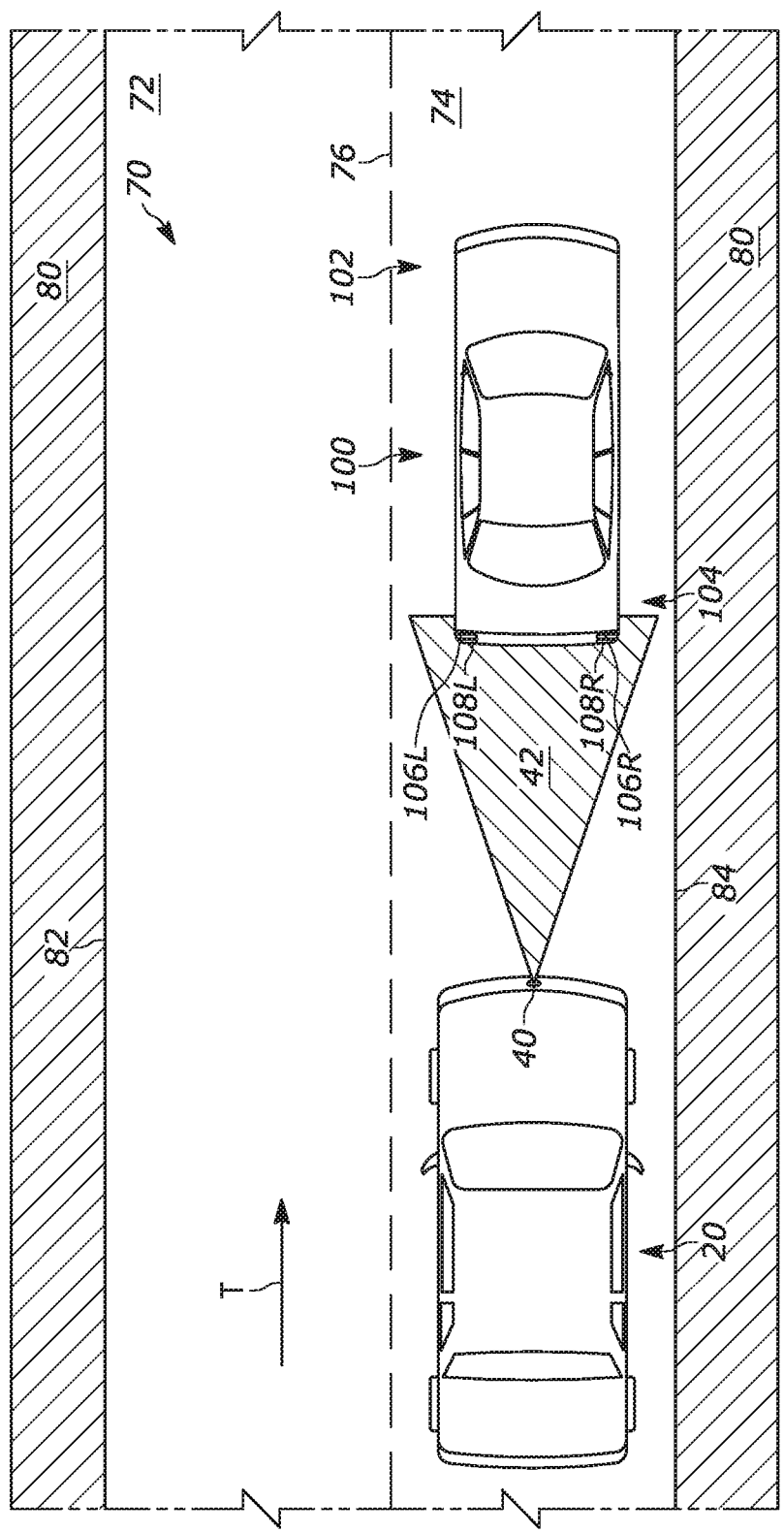
FIG. 3A is a schematic illustration of the host vehicle traveling on a roadway and detecting a second vehicle in front of the host vehicle.

Referring to FIG. 3A, the vehicle 20 is configured to travel along a roadway 70. The roadway 70 has a direction of vehicle travel illustrated by the arrow T. The roadway 70 includes a series of lanes 72, 74 separated by a dashed dividing line 76. Fewer lanes or additional lanes and dividing lines are contemplated but not shown. The roadway 70 is bounded from the surrounding off-road terrain 80 by a boundary line 82 on the left side (relative to the traveling direction T) and by a boundary line 84 on the right side.

Figure 3B:
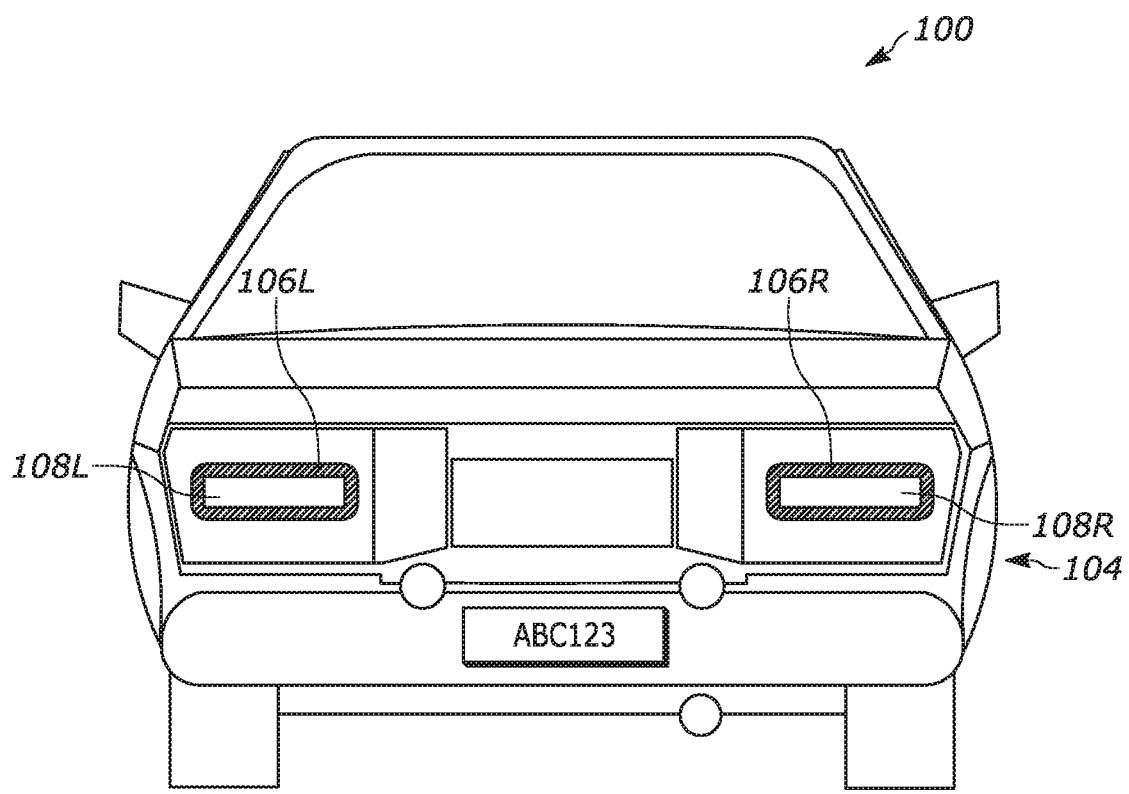
FIG. 3B is a rear view of the second vehicle of FIG. 3A.

As the vehicle 20 travels down the road 70, the camera 44 detects objects in front of the vehicle 20 within the field of view 42. In one example, the camera 44 detects a second vehicle 100 traveling on the road 70 ahead of the host vehicle and in the same lane 74. The second vehicle 100 extends from a front end 102 to a rear end 104. Brake lights 106L, 106R are provided on the rear end 104 (see also FIG. 3B). One or more light sources are provided on the rear end 104 adjacent the brake lights 106L, 106R. As shown, a pair of light sources 108L, 108R is provided on the rear end 104 and associated with each brake light 106L, 106R. In another example, a single light source can be provided between the brake lights 106L, 106R (not shown). The light sources 108L, 108R can be light emitting diodes (LEDs) that emit non-visible light, e.g., infrared light or ultraviolet light. The lights sources 108L, 108R could also emit visible light, e.g., about 380-740 nm.

Figure 4:
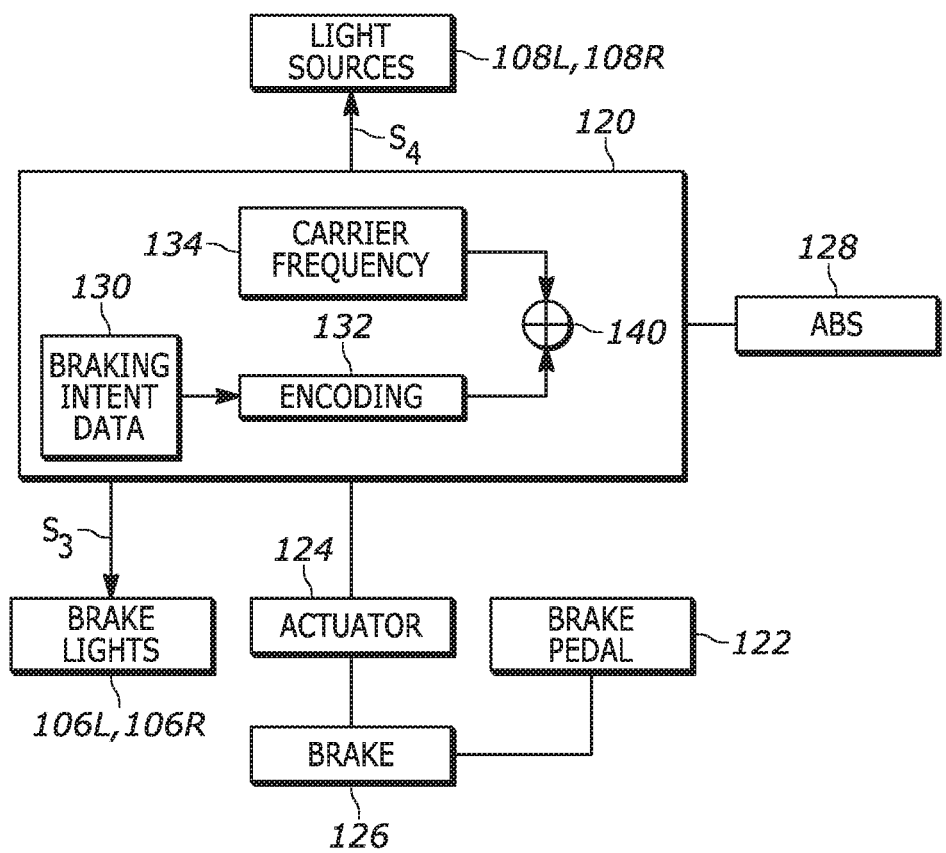
FIG. 4 is a schematic illustration of a portion of the second vehicle

A controller 120 (FIG. 4) is connected to the brake lights 106L, 106R and the light sources 108L, 108R and controls operation thereof. A brake pedal 122 can be depressed by the operator of the second vehicle 100 to actuate a brake 126 and thereby decrease the speed of the vehicle 100, i.e., control a brake operation thereof. The controller 120 is also electrically or wirelessly connected to an actuator 124 associated with the brake 126.

The controller 120 can send a control signal to the brake actuator 124 to actuate the brake 126 in response to, for example, operator command, sensed vehicle collision, during adaptive cruise control, etc. Consequently, the brake 126 can be controlled by the operator or the controller 120. In either case, when the brake 126 is operated the controller 120 sends one or more signals $S_3$ to the brake lights 106L, 106R. In response, the brake lights 106L, 106R illuminate to visually inform vehicles behind the second vehicle 100, e.g., the vehicle 20, of an intended deceleration of the vehicle 100.

When the brake 126 is operated, e.g., by depressing the brake pedal 122 or autonomously by the controller 120, the controller monitors the position of the brake pedal and outputs one or more signals $S_4$ indicative of the vehicle 100 braking commanded by the operator. To this end, the signal $S_4$ is indicative of the braking intensity or profile commanded by the operator. The signal $S_4$ is also output when the actuator 124 is used to operate the brake 126 and reflects the braking intensity or profile commanded by the controller 120.

The signal $S_4$ can also be output when the controller 120 activates an anti-lock brake system (ABS) 128. This activation can occur, for example, when the controller 120 determines road conditions and/or environmental conditions are likely to cause or are causing traction issues between the second vehicle 100 and the roadway 70. The signal $S_4$ in this case is therefore indicative of a commanded activation of the ABS 128. Activating the ABS 128 can be in addition to or in lieu of applying the brake 126. That said, in all three cases the signal $S_4$ represents a commanded deceleration of the vehicle 100.

In each of the aforementioned scenarios, the signal $S_4$ causes the light sources 108L, 108R to emit non-visible light in a particular sequence, pattern, intensity, etc. indicative of the commanded deceleration. In the configuration shown in FIG. 4, the controller 120 quantifies the commanded brake operation as braking intent data 130. This can include, for example, the force, speed, and acceleration applied to the brake 126, activation of the ABS 128, etc. The controller 120 then uses a look-up table or the like to encode 132 the braking intent data 130 into, for example, a digital signal. The encoded signal is then used to modulate a carrier frequency 134 in an exclusive or (XOR) operation 140. In one example, pulse width modulation is used to combine the encoded signal with the carrier frequency 134. The modulated signal is the signal $S_4$ sent to and output by the light sources 108L, 108R.

Referring back to FIGS. 2-3A, in operation the system 30 on the host vehicle 20 is configured to monitor both the actual and commanded deceleration of the vehicle 100 based on the signals $S_3$, $S_4$. To this end, the camera 44 acquires visual images of the vehicle 100, including images of the brake lights 106L, 106R within the field of view 42. The images are sent to and processed by the software module 46 to determine the actual deceleration of the vehicle 100. This can be accomplished by, for example, comparing the size and/or intensity of the brake lights 106L, 106R in different images or monitoring the distance between vehicles 20, 100 over time. Regardless, the actual deceleration data is sent as the signal $S_1$ to the controller 50.

Simultaneously, the camera 44 detects the non-visible light emitted by the light sources 108L, 108R. Data indicative of the detected non-visible light is sent to and processed by the software module 46. The software module 46 decodes the modulated signals output by the light sources 108L, 108R and captured by the camera 44. The decoded signals are used to determine the commanded or intended deceleration of the vehicle 100. The commanded deceleration data is sent as the signal $S_2$ to the controller 50. The controller 50 on the host vehicle 20 continuously receives the first and second signals $S_1$, $S_2$ from the camera 44 to thereby continuously detect and monitor any actual and commanded deceleration of the second vehicle 100.

The controller 50, in response to receiving the signals $S_1$, $S_2$, determines whether to initiate a braking operation in the host vehicle 20. For instance, the controller 50 can compare the first signals $S_1$ to the second signals $S_2$ and determine whether the second vehicle 100 is undergoing slippage. Slippage can be due to tire condition, the severity of the commanded deceleration, moisture on the roadway, etc. When the first signals $S_1$ indicate that the actual deceleration is less than the commanded deceleration reflected in the second signals $S_2$ by a predetermined amount, the controller 50 can actuate the brake actuator 52 to initiate braking and apply the brake 54 at a desired/or apply a traction control profile, etc.

In one example, the predetermined amount is sufficient to account for tolerances in the devices used to generate the signals, e.g., the controllers 50, 120 and the camera assembly 40. In other words, the difference between the signals $S_1$, $S_2$ should be significant enough that a false indication is not made that the second vehicle 100 is slipping when in fact no slipping is occurring.

On the other hand, when the signals $S_1$, $S_2$ indicate that the difference between the actual deceleration and the commanded deceleration of the second vehicle 100 is at or within the predetermined amount, the controller 50 determines that no slippage has occurred. While the controller 50 may not subsequently initiate braking based on this result of this signal $S_3$, $S_4$ comparison, it will be appreciated that the controller may nonetheless initiate braking based on a determination that the second vehicle 100 is braking.

As noted, the signal $S_4$ can also indicate that the second vehicle 100 activated its ABS 128. When this occurs, the signals $S_2$ received by the controller 50 are indicative of ABS 128 activation. In response thereto, the controller 50 actuates the brake actuator 52 to apply the brake 54 in the desired manner.

It will be appreciated that the controller 50 can initiate alternative or additional safety measures when it determines the second vehicle 100 is undergoing slippage. For example, the controller 50 can initiate airbag actuation in the event of a crash scenario detection and/or steering control to perform an evasive maneuver to avoid/mitigate collision with the second vehicle (neither being shown).

From the above, it is clear that using non-visible light for inter-vehicle data transfer is advantageous because the light is not visible to humans/other drivers and therefore is not distracting. Moreover, most driving light sources, e.g., stop lights, street lights, etc., do not include non-visible light. Consequently, the camera assembly shown and described herein can determine with a high degree of probability that the non-visible light acquired in the images is from the lights sources of the other vehicle. In other words, the non-visible light is specific to the braking intent data, does not interfere with traditional light sources, and therefore provides a reliable information source for the system. With this in mind, the ability of the system shown and described herein to acquire and process data related to not only the actual braking of the other vehicle but the intended/commanded braking allows the host vehicle to more accurately react thereto in situations where slippage occurs in the other vehicle.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is commanded to embrace all such alterations, modifications and variations that fall within the spirit and scope of the appended claims.

What is claimed is:

1. A method of braking a host vehicle traveling behind a second vehicle, comprising:
   acquiring visual images of the brake lights of the second vehicle and determining an actual deceleration of the second vehicle based on a detected illumination of the brake lights within the visual images;
   detecting non-visible light emitted by the second vehicle and determining a commanded deceleration of the second vehicle based on the detected light;
   producing a first signal indicative of the actual deceleration and a second signal indicative of the commanded deceleration;
   comparing the first signal to the second signal;
   determining that the second vehicle is undergoing wheel slippage when the actual deceleration is less than the commanded deceleration by at least a predetermined amount; and
   initiating braking of the host vehicle in response to the determination.

2. The method recited in claim 1, wherein detecting non-visible light emitted by the second vehicle comprises detecting infrared light.

3. The method recited in claim 1, wherein the first signal comprises data indicative of an actual braking force applied to a brake of the second vehicle.

4. The method recited in claim 1, wherein the second signal comprises data indicative of an active anti-lock braking system.

5. The method recited in claim 1, wherein the second signal is produced in response to decoding a modulated signal emitted by the non-visible light.

6. The method recited in claim 5, wherein the modulated signal is a pulse width modulated signal.

7. The method recited in claim 1, wherein the controller initiates braking when the second signal is indicative of the second vehicle activating an anti-lock braking system.

8. A system for braking a host vehicle traveling behind a second vehicle on a roadway, comprising:
   a camera assembly provided on the host vehicle for acquiring visual images of the brake lights of the second vehicle and determining an actual deceleration of the second vehicle based on a detected illumination of the brake lights within the visual images, the camera assembly detecting non-visible light emitted by the second vehicle and determining a commanded deceleration of the second vehicle based on the detected light, the camera assembly producing a first signal indicative of the actual deceleration and a second signal indicative of the commanded deceleration; and
   a controller for receiving the first and second signals, wherein the controller determines that the second vehicle is undergoing wheel slippage when the actual deceleration is less than the commanded deceleration by at least a predetermined amount and initiates braking of the host vehicle in response to the determination.

9. The system recited in claim 8, wherein detecting non-visible light emitted by the second vehicle comprises detecting infrared light.

10. The system recited in claim 8, wherein the first signal comprises data indicative of an actual braking force applied to a brake of the second vehicle.

11. The system recited in claim 8, wherein the second signal comprises data indicative of an active anti-lock braking system.

12. The system recited in claim 8, wherein the second signal is produced in response to decoding a modulated signal emitted by the non-visible light.

13. The system recited in claim 12, wherein the modulated signal is a pulse width modulated signal.

14. The system recited in claim 8, wherein the controller initiates braking when the second signal is indicative of the second vehicle activating an anti-lock braking system.

15. The system recited in claim 8, wherein the actual deceleration of the second vehicle is based on comparing an intensity of the illumination of the brake lights in different images.

16. The method recited in claim 1, wherein the actual deceleration of the second vehicle is based on comparing an intensity of the illumination of the brake lights in different images.

* * * * *